(12) United States Patent
Lu et al.

(10) Patent No.: US 9,378,498 B2
(45) Date of Patent: Jun. 28, 2016

(54) METHOD FOR LOADING DOUBLE E-WALLETS

(75) Inventors: Zhou Lu, Beijing (CN); Huazhang Yu, Being (CN)

(73) Assignee: FEITIAN TECHNOLOGIES CO., LTD, Beijing (CN)

( * ) Notice: Subject to any disclaimer, the term of this patent is extended or adjusted under 35 U.S.C. 154(b) by 877 days.

(21) Appl. No.: 12/989,764

(22) PCT Filed: Sep. 7, 2010

(86) PCT No.: PCT/CN2010/076701
§ 371 (c)(1),
(2), (4) Date: Oct. 26, 2010

(87) PCT Pub. No.: WO2011/060662
PCT Pub. Date: May 26, 2011

(65) Prior Publication Data
US 2011/0196788 A1     Aug. 11, 2011

(30) Foreign Application Priority Data

Nov. 20, 2009  (CN) .......................... 2009 1 0237875
Nov. 20, 2009  (CN) .......................... 2009 1 0237876

(51) Int. Cl.
| | |
|---|---|
| *G06K 7/00* | (2006.01) |
| *G06Q 20/36* | (2012.01) |
| *G06Q 20/34* | (2012.01) |
| *G06Q 20/10* | (2012.01) |
| *G07F 7/08* | (2006.01) |

(52) U.S. Cl.
CPC  *G06Q 20/36* (2013.01); *G06K 7/00* (2013.01); *G06Q 20/105* (2013.01); *G06Q 20/341* (2013.01); *G06Q 20/343* (2013.01); *G06Q 20/3433* (2013.01); *G06Q 20/352* (2013.01); *G06Q 20/363* (2013.01); *G06Q 20/367* (2013.01); *G06Q 20/3672* (2013.01); *G06Q 20/3676* (2013.01); *G07F 7/08* (2013.01)

(58) Field of Classification Search
CPC ........... G06K 7/00; G07F 7/08; G06Q 20/343
USPC ........................................................ 235/379
See application file for complete search history.

(56) References Cited

U.S. PATENT DOCUMENTS 6,611,819 B1 *  8/2003  Oneda .............................. 705/41
8,862,052 B2 * 10/2014  Corda ........................... 455/41.1

(Continued)

*Primary Examiner* — Steven Kim
*Assistant Examiner* — Tim Hale
(74) *Attorney, Agent, or Firm* — Bright IP Law Offices

(57) ABSTRACT

The invention discloses a method for loading double e-wallets, relating to the information security field. The method includes steps of entering into a contactless inductive area of a terminal by the CPU card; being powered on and initialized, synchronizing a first e-wallet and a second e-wallet by the CPU card; receiving and executing INITIALIZE FOR LOAD instruction sent by the terminal, and returning a response message of INITIALIZE FOR LOAD instruction to the terminal, by the CPU card; receiving the response message of INITIALIZE FOR LOAD instruction and sending data in the response message of INITIALIZE FOR LOAD instruction, to a host, by the terminal; receiving and storing the data, sending LOAD allowing message to the terminal, by the host; receiving LOAD allowing message and sending LOAD instruction to the CPU card, by the terminal; receiving LOAD instruction, performing loading operation on the second e-wallet, refreshing balance of the first e-wallet and returning the response message of LOAD instruction, to the terminal, by the CPU card.

12 Claims, 5 Drawing Sheets

(56) References Cited

U.S. PATENT DOCUMENTS

| | | | |
|---|---|---|---|
| 2004/0103063 A1* | 5/2004 | Takayama et al. | 705/41 |
| 2009/0039156 A1* | 2/2009 | Brandli et al. | 235/382 |
| 2009/0070265 A1 | 3/2009 | Hrabosky | |
| 2010/0082492 A1* | 4/2010 | Jarman et al. | 705/67 |
| 2010/0197224 A1* | 8/2010 | Lahdenniemi et al. | 455/41.1 |

* cited by examiner

METHOD FOR LOADING DOUBLE E-WALLETS

FIELD OF THE INVENTION

The invention relates to information security field, in particularly, to a method for loading double e-wallets.

BACKGROUND OF THE INVENTION

With mature technology, low cost, the logical cipher card Mifare1 (M1) takes most proportion of applications of smart card in traditional metropolis transportation industry. However, there are no independent CPU and operation system inside the M1 card and the security authentication and protection are realized completely dependent on the built-in logical circuit, which results in that the M1 card is easy to be cracked. Following the tendency of "one card for more applications and intercommunication for more cards", the volume of the money in the e-wallet of the M1 card will become higher and higher, and therefore the security problem of M1 has been paid more attention.

Since CPU card has central processing unit (CPU), RAM, ROM and EEPROM and on-chip operating system, it is much safer than the M1 card. However, the high price of the CPU card limits its further application. Contactless CPU card, which has been prompted in the recent years, approximates to the M1 card in price and its technology is also becoming mature, which makes it possible to widely prompt the application of the CPU card to replace the M1 card.

Although there is a CPU card including M1 and CPU parts in the prior art, there is great risk when recharging the CPU card at an M1 terminal, and it is also impossible to purchase with the CPU card at current M1 terminal, which results in great inconvenience to the users. Further, the two parts of the CPU card are totally independent in internal processing operation, without any synchronization mechanism for synchronizing the two parts.

SUMMARY OF THE INVENTION

For solving the above problems in the prior art, a method for loading double e-wallets at a CPU terminal is provided in the invention, comprising steps of:

entering, by the CPU card, into a contactless inductive area of a terminal, which is connected to a CPU card in accordance with ISO 14443 Interface Protocol;

being powered on and initialized, synchronizing a first e-wallet and a second e-wallet, and waiting for receiving a instruction sent by the terminal, by the CPU card;

sending an INITIALIZE FOR LOAD instruction to the CPU card, by the terminal;

receiving the INITIALIZE FOR LOAD instruction, executing a load initialization operation, and returning a response message of INITIALIZE FOR LOAD instruction to the terminal, by the CPU card;

receiving the response message of INITIALIZE FOR LOAD instruction and sending data in the response message of INITIALIZE FOR LOAD instruction, to a host, by the terminal;

receiving and storing the data, sending LOAD receiving message to the terminal, by the host;

receiving LOAD receiving message and sending LOAD instruction to the CPU card, by the terminal;

receiving LOAD instruction, performing loading operation on the second e-wallet, refreshing the first e-wallet and returning the response message of LOAD instruction, to the terminal, by the CPU card; and receiving the response message of LOAD instruction, by the terminal, and ending the loading transaction.

Advantages: the invention provides a method for loading double e-wallets at CPU terminal, the usage of CPU terminal in loading e-wallet improves security of loading e-wallet at M1 terminal in prior art, purchase with double e-wallets in a CPU card at an existed M1 terminal without changing M1 purchase terminal makes convenience to users, and synchronizing the double e-wallets in the CPU card ensures the same balance gotten in both e-wallets in the CPU card.

DETAILED DESCRIPTION OF THE DRAWINGS OF THE INVENTION

DETAILED DESCRIPTION OF THE PREFERRED EMBODIMENTS

Figure 1:
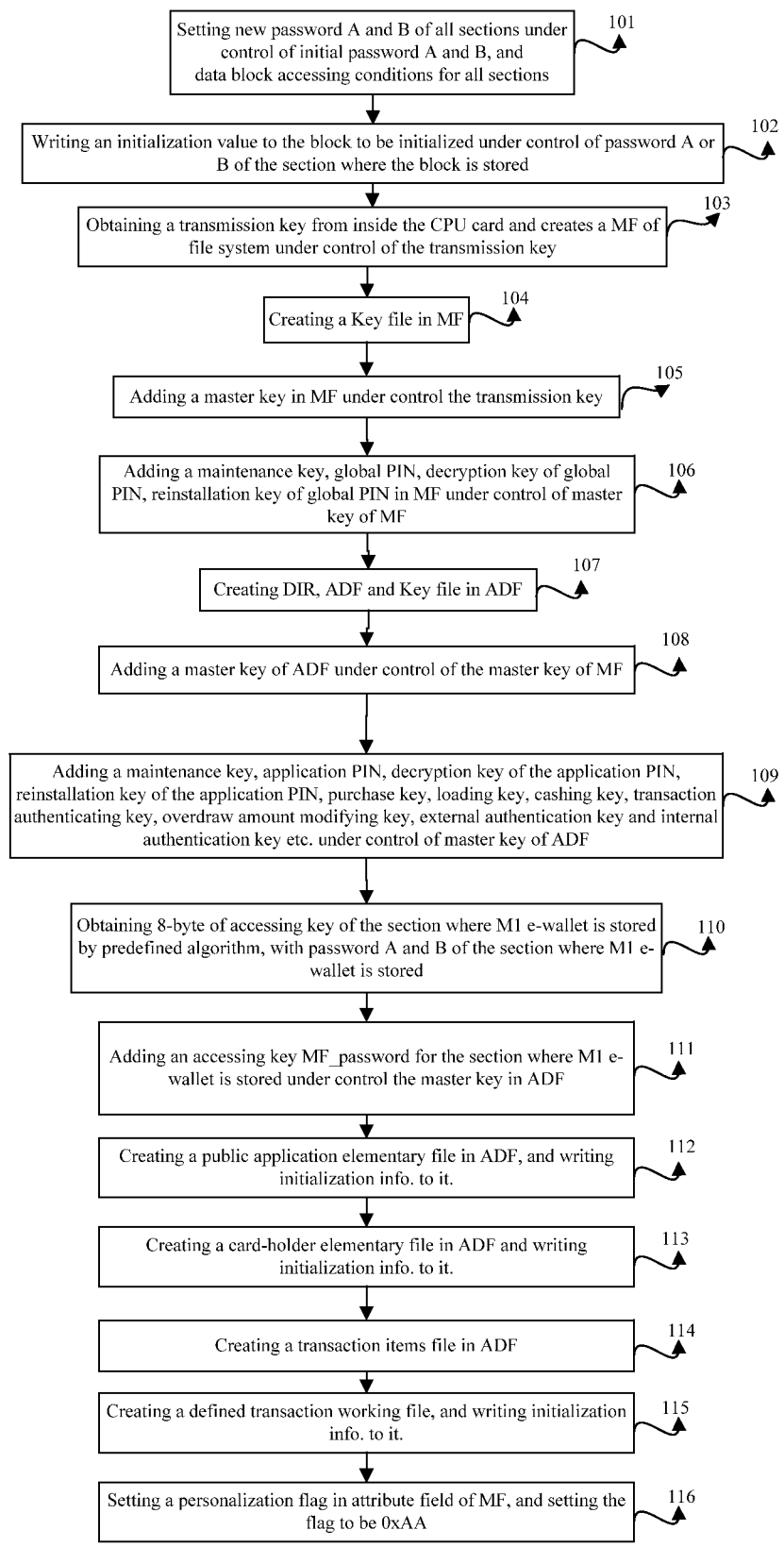
FIG. 1 is a flow chart of a method for personalizing M1 and CPU parts of a double-CPU card in an embodiment.
Figure 2:
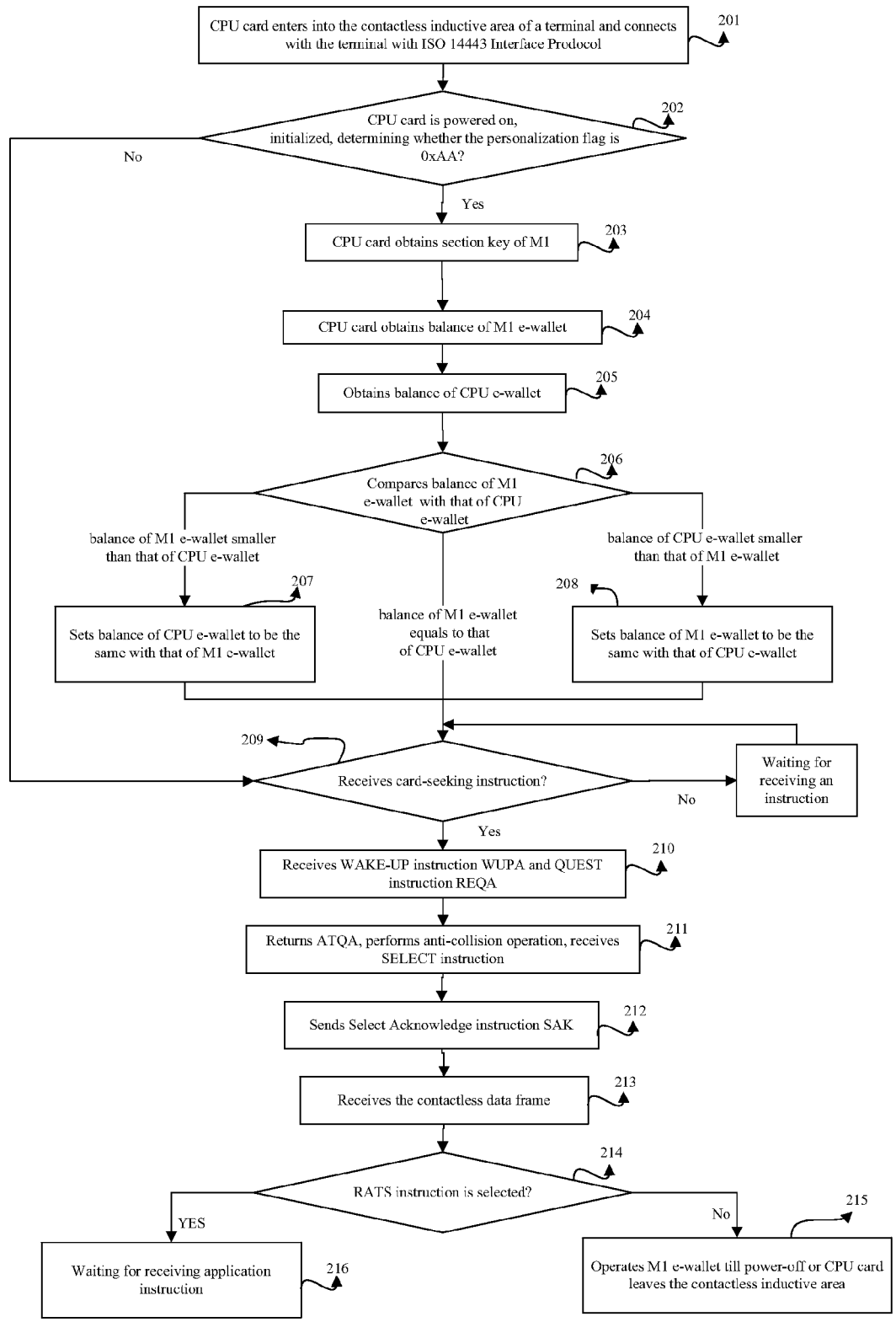
FIG. 2 is a flow chart of a method for synchronizing CPU e-wallet and M1 e-wallet in a CPU card in an embodiment.
Figure 3:
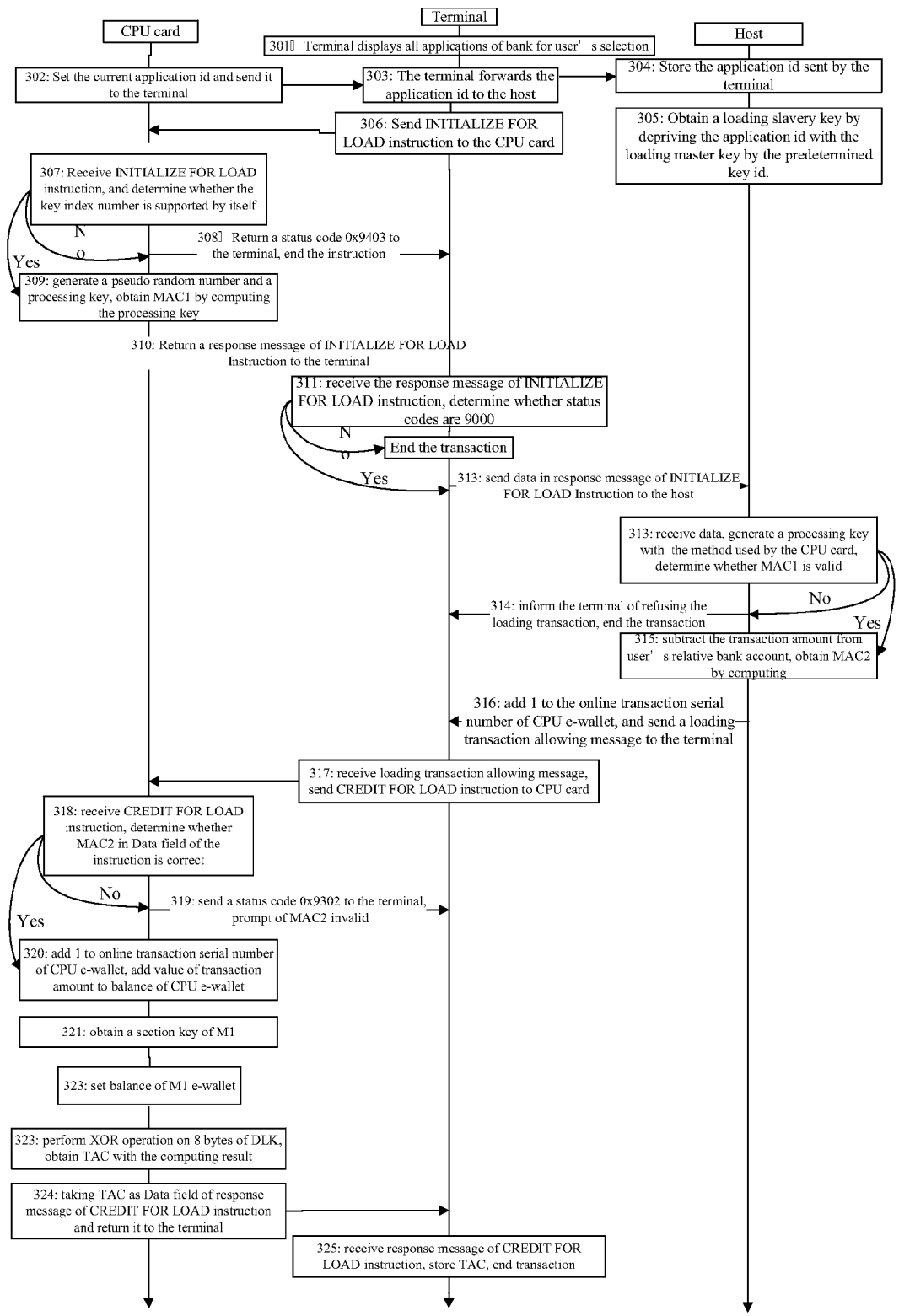
FIG. 3 is a flow chart of a method for loading the CPU e-wallet and M1 e-wallet in a CPU card at CPU terminal at the same time in an embodiment.
Figure 4:
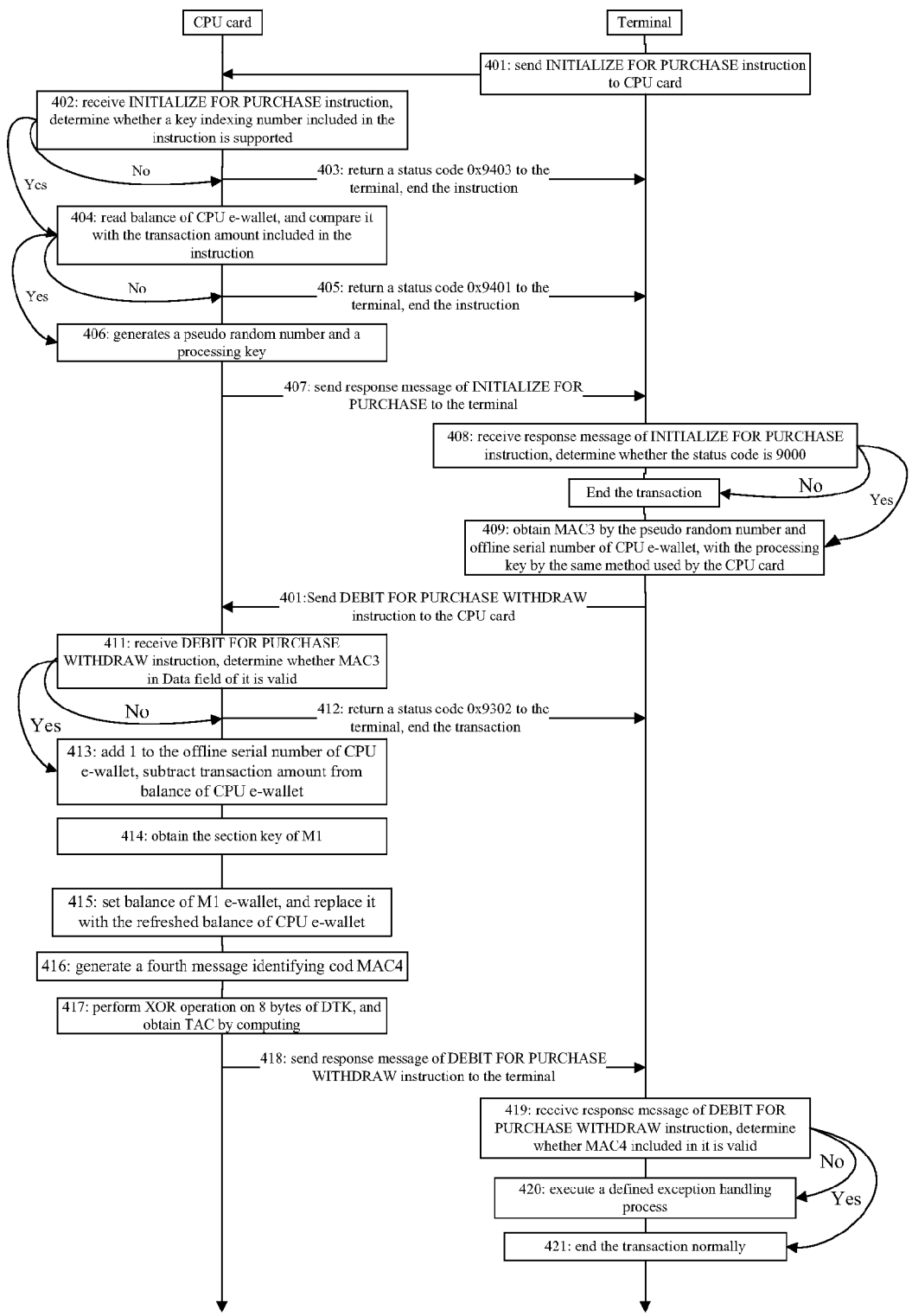
FIG. 4 is a flow chart of a method for purchasing with CPU e-wallet and M1 e-wallet in a CPU card at CPU terminal in an embodiment.
Figure 5:
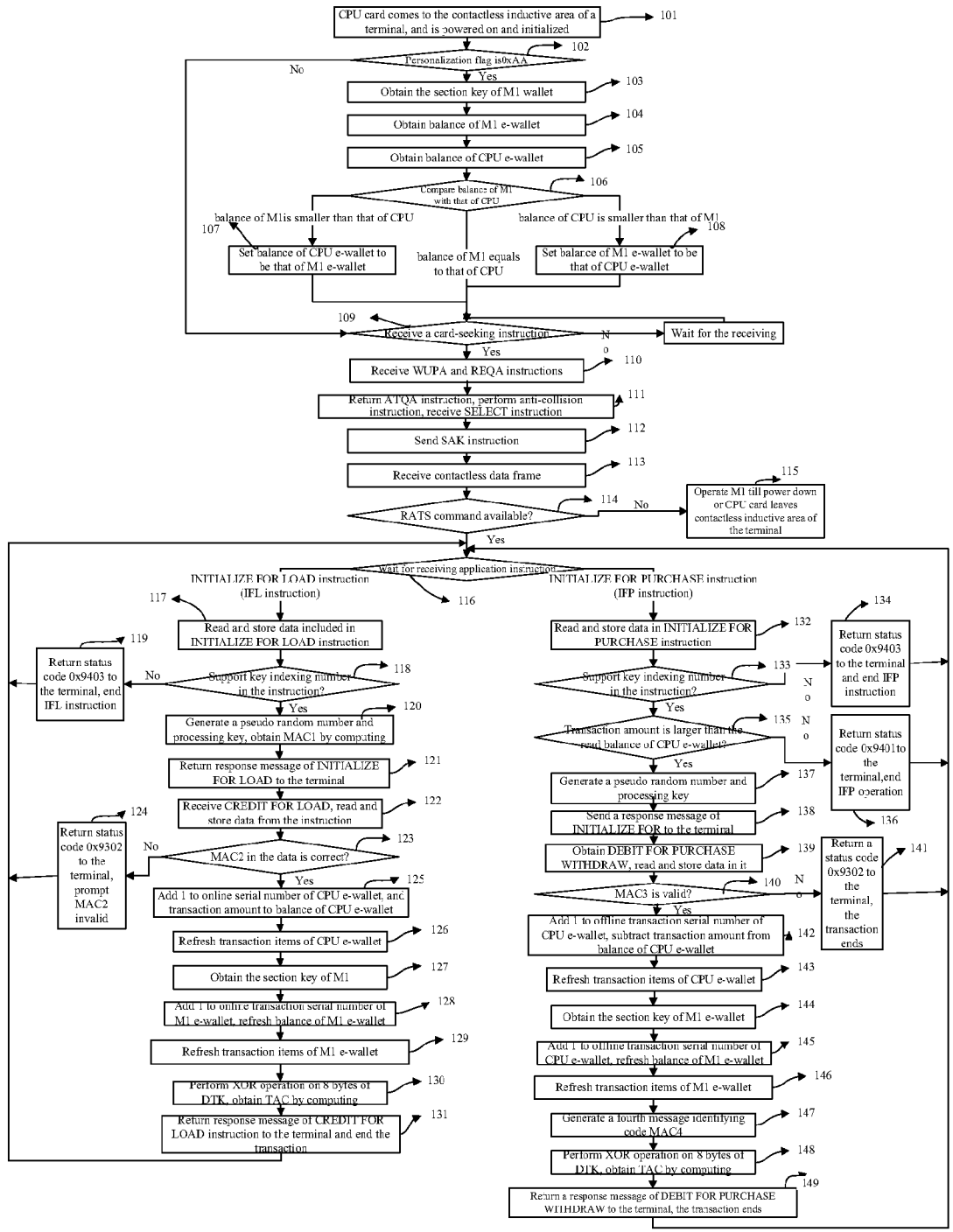
FIG. 5 is a flow chart of a method for operating double e-wallets in a CPU card in an embodiment.

The purpose and technical solutions of the invention will become apparent from the following description of the preferred embodiments in combination with the drawings.

The invention applies a double-interface CPU card, which is a contactless CPU card with ISO 1443 interface and Mifare 1, such as SLE66CL80PEM and P5CD012 etc. The contactless CPU card helps the invention to realize the application of double e-wallets. More particularly, the ISO 14443 interface in the contactless CPU card provides the e-wallet function in accordance with banking standard, viz. CPU e-wallet, and the Mifare 1 in the contactless CPU card realizes the banking application based on logic cipher chip standard, viz. M1 e-wallet. Although these two kinds of e-wallets are separate on hardware, the CPU e-wallet can access the M1 e-wallet. In the invention, CPU card with double e-wallets is a contactless CPU card and CPU terminal is a contactless terminal.

Embodiment 1

The embodiment provides a method for personalizing M1 and CPU parts in the CPU card respectively, for example, first personalizing the M1 part of the CPU card, then personalizing the CPU part of the CPU card, or first personalizing the CPU part of the CPU card, then personalizing the M1 part of the CPU card. In the embodiment, an example is taken by personalizing the M1 part first, and then the CPU part, including steps as follows.

Step 101: under control of initialization passwords A and B, set new passwords A and B for all sections in the M1 part along with setting access conditions for all data blocks in different sections.

In the embodiment, there are total 16 sections in the M1 part, for which new password A and password B must be set respectively, and there are four blocks in each section, of which the first three blocks are data blocks for storing data and the last block is control block including the password A of 6 bytes and the password B of 6 bytes for all sections and access requirements of 4 bytes for all data blocks.

Step 102, write an initialization value to the data block under control of the password A or password B of the section where the data block to be initialized is stored;

Specifically in Step 102, if the balance of the predetermined M1 e-wallet is written in Block 0 of Section 1, when Block 0 of Section 1 is initialized, the writing step is writing initialization value of M1 e-wallet, to Block 0 under control of password A or B of Section 1, viz. 00000000FFFFFFFF0000000004FB04FB is written in Block 0, of which the first four bytes 00000000 refer to the initialization value written to the M1 wallet and the next four bytes FFFFFFFF refer to the complementary of the initialization value of M1 e-wallet, the subsequent four bytes 00000000 refer to the initialization value of M1 e-wallet, and the last four bytes 04FB04FB refer to the block number, the complementary of the block number, block number, the complementary of the block number of the data block where the balance of M1 e-wallet is stored.

Step 101 and Step 102 specifically describe the process of initializing the M1 part, a detailed description will be given below to describe the process of initializing the CPU part:

Step 103: obtain the transmission key in the CPU card and create a main directory MF of file system under the control of the transmission key;

Step 104: create a KEY file of a main file MF;

Step 105: add a master key in the main file MF under the control of the transmission key;

Step 106: add a maintenance key of the MF, a global PIN (personal identification number), a decryption key of the global PIN, and a reinstallation key of the global PIN etc under the control of the master key of MF;

Step 107: create an application directory file (DIR), PBOC application file (ADF) and KEY file of ADF;

Step 108: add a master key of the ADF under the control of the master key of the MF;

Step 109: add a maintenance key of the ADF, an application PIN, a decryption key of the application PIN, a reinstallation key of the application PIN, a purchase key, a loading key, a cashing key, a transaction authenticating (TAC) key, an overdraw amount modifying key, an external authentication key and an internal authentication key etc.

Step 110: compute an 8-byte section accessing key MF_password using password A and password B of the section where the M1 e-wallet is stored;

In Step 110, to be specifically, the method of computing the 8-byte section accessing key MF_password using password A and password B of the section where the M1 e-wallet is stored is: computing password A and password B of the section where M1 e-wallet is stored with Hash algorithm to obtain 16 bytes, taking the obtained 16 bytes as the key of 3DES algorithm with which the 8-byte initialization value 0000000000000000 is encrypted, and the encrypted result is the access key of the section where M1 e-wallet is stored.

More particularly, the input password A and password B of section 1 where M1 e-wallet is stored are A0A1A2A3A4A5 and B0B1B2B3B4B5 respectively, performing Hash operation on password A and password B to obtain a result 40424446484A7E00 007E60626466686A, taking the result as a key of 3DES algorithm, encrypting the initialization value 0000000000000000 with 3DES algorithm to obtain a result: 8C7F46D76CE01266, viz. the obtained section accessing key is: 8C7F46D76CE01266.

Step 111: add a section accessing key MF_password for the section where the M1 e-wallet is stored under the control of the master key of the ADF;

In the embodiment, the section accessing key MF_password for the section where the M1 e-wallet is stored can be further written to a designated location in the CPU part storage area of the CPU card.

Step 112: create a public application elementary file (SFI=0x15) in the ADF and write initialization information to the file;

Step 113: create a card-holder elementary file (SFI=0x16) in the ADF and write initialization information to the file;

Step 114: create transaction items file in the ADF (SFI=0x18);

Step 115: create a self-defined transaction file in the ADF and write an initialization value to the file;

In the step 115, the initialization value being written to the self-defined transaction file is the balance of the CPU e-wallet, 00000000.

Step 116: set a personalization flag in the MF attribute field, and set the personalization flag to be 0xAA, identifying that the personalization operation has been performed on the CPU card.

In the embodiment, a file can further be created, in which a personalization flag is set to be 0xAA identifying that the CPU card has been performed personalization operation; or a designated location in the CPU part storage area of the CPU card can be set to be a personalization flag 0xAA for identifying the CPU card having been personalized;

wherein 0xAA is self-defined, which can be alternated with 0x01, and thus Step 116 can be setting the personalization flag to be 0x01; or step 116 can be replaced with a step of creating a flag file in the MF for identifying that the CPU card has been personalized.

In the embodiment, a method for personalizing the M1 part and the CPU part in the CPU card is provided in which the access key for the section where the M1 e-wallet is stored is written to the CPU part, therefore the CPU e-wallet application can access the M1 e-wallet, read and modify the balance of the M1 e-wallet.

Embodiment 2

The embodiment provides a method for synchronizing the CPU e-wallet and the M1 e-wallet inside a CPU card. The CPU card synchronizes the CPU e-wallet and the M1 e-wallet each time when the CPU card being powered on, which prevents illegal charging the CPU card using an M1 terminal. For example, after a user charges the M1 e-wallet inside the CPU card using the M1 terminal, the CPU card synchronizes the CPU e-wallet and the M1 e-wallet when being powered on, that is, comparing the balance of CPU e-wallet with that of the M1 e-wallet and replacing the larger balance with the smaller, and therefore the balance of M1 e-wallet is replaced with the balance of CPU e-wallet, that is, the M1 e-wallet is not been illegal charged. Or, when a user purchases with the CPU card at the M1 terminal, transaction amount is subtracted from balance of M1 e-wallet rather than from balance of CPU e-wallet, only after the process the CPU card synchronizes CPU e-wallet and M1 e-wallet when the CPU card being powered on, and therefore balance of CPU e-wallet is set to be the same as the balance of M1 e-wallet, viz. the transaction amount is subtracted from the balance of CPU e-wallet. The method includes steps as follows.

Step 201, the CPU card enters into a contactless inductive area of a terminal and establishes a connection to the terminal in accordance with the ISO 14443 Interface Standard;

Step 202, the CPU card is powered on and initialized, determines whether the value of the personalization flag is 0xAA, if the value is 0xAA, Step 203 is executed; otherwise, Step 209 is executed;

In the embodiment, 0xAA is predetermined by the CPU card and the card distributing system, and is self-defined, which identifies the CPU card having been personalized as predetermined, that is, when the personalization flag 0xAA is predetermined, it identifies that the CPU card has been personalized, or it identifies that the CPU card has not been personalized. or, As predetermined by the card distributing system and the CPU card, if the card distributing system has personalized the CPU card, the card distributing system creates a flag file in the main file MF of file system in the CPU card, and if the CPU card determines a flag file is available inside, it means that the CPU card has been personalized; and if the CPU card determines a flag file is not available inside, it means that the CPU card has not been personalized.

Step 203, the CPU card obtains a section key of the M1 e-wallet;

In the embodiment, the block number and the section number of the storage area for storing the balance of M1 e-wallet are predetermined, to obtain the section key of the M1 e-wallet according to the predetermined section number and the step is realized by the predetermined section number, more practically, the step is transferring API interface function extern WORD GetMifareSectorPassword (BYTE*secPwdBuf, BYTE blockNo) to obtain the section key of the M1 e-wallet.

Step 204, the CPU card obtains the balance of the M1 e-wallet;

In the embodiment, the CPU card obtains the balance of the M1 e-wallet according to the section key of the M1 e-wallet obtained in Step 103 and the predetermined block number of the storage area for storing the balance of the M1 e-wallet, more practically, that is transferring API interface function extern BYTE GetMifarePurseBalance (BYTE*balanceBuf) to obtain the balance of M1 e-wallet.

Step 205, the CPU card obtains the balance of the CPU e-wallet;

Specifically, Step 205 includes the steps of
retrieving the address of the application file ADF;
retrieving the address of the CPU e-wallet file in the ADF in accordance with the application file ADF;
computing the address where the balance of the CPU e-wallet is stored by the retrieved address of the CPU e-wallet file and the predetermined offset of the balance of the predetermined CPU e-wallet;
reading the balance of the CPU e-wallet by the obtained address where the balance of the CPU e-wallet is stored; or
reading the address where the balance of CPOU e-wallet is stored from a storage area predetermined for storing address of the balance of the CPU e-wallet inside the CPU card, and reading the balance of CPU e-wallet by the read address directly.

Step 206, synchronize the M1 e-wallet and the CPU e-wallet, that is, comparing the balance of M1 e-wallet with the balance of CPU e-wallet, if balance of the M1 e-wallet is smaller than balance of the CPU e-wallet, Step 207 is executed; if the balance of CPU e-wallet is smaller than the balance of M1 e-wallet, Step 208 is executed; if the balance of the M1 e-wallet equals to balance of the CPU e-wallet, Step 209 is executed.

Step 207, set the balance of CPU e-wallet to be the same as the balance of M1 e-wallet, and then Step 209 is executed;

Specifically, Step 207 includes the steps of
retrieving the address of the application file ADF;
retrieving the address of the CPU e-wallet file in the ADF in accordance with application file ADF;
computing the address where the balance of CPU e-wallet is stored by the retrieved address of the CPU e-wallet file and the predetermined offset of the balance of CPU e-wallet;
clearing the data in the storage area to which the above address points, and writing the balance of the M1 e-wallet to the storage area to which the above address points as the new balance of the CPU e-wallet; or
reading the address of the balance of the CPU e-wallet from the predetermined storage area;
clearing the data in the storage area to which the above address points, and writing the balance of the M1 e-wallet to the storage area to which the above address points as the new balance of the CPU e-wallet;

Further, setting the balance of the CPU e-wallet to be the same as the balance of the M1 e-wallet further includes: refreshing the transaction items of the CPU e-wallet with the steps of
reading the detailed time of the last transaction item of the CPU e-wallet;
comparing the time of each transaction item of the M1 e-wallet with the time read above;
adding all transaction items of the M1 e-wallet, after the above read time, to transaction items of the CPU e-wallet;
the transaction items include a transaction amount, a transaction IDENTIFICATION, a terminal machine number, a transaction date and a transaction time etc;

Further, after refreshing the transaction items of the CPU e-wallet, it further includes:
adding, to the offline transaction serial number of the CPU e-wallet, a value corresponding to the number of the transaction items of the M1 wallet being added to the CPU e-wallet, wherein the corresponding value is equal to the number of the transaction items, for example, if the number of the transaction items of the M1 e-wallet being added to the CPU e-wallet is 5, the adding step adds 5 to the offline transaction serial number of the CPU e-wallet.

Step 208, set the balance of M1 e-wallet to be the same as the balance of the CPU e-wallet, and then Step 209 is executed;

Specifically, Step 208 includes the steps of:
invoking API interface function extern WORD GetMifareSectorPassword (BYTE*secPwdBuf, BYTE blockNo) to obtain the section key of the M1 e-wallet by the predetermined section number;
invoking API interface function extern BYTE SetMifarePurseBalance (BYTE*balanceBuf), and setting the balance of the M1 e-wallet by the obtained section key of the M1 e-wallet, viz. setting the balance of the M1 e-wallet to be the same as the balance of the CPU e-wallet;
setting the balance of the M1 e-wallet to be the same as the balance of the CPU e-wallet further includes: refreshing the transaction items of the M1 e-wallet with the steps of:
reading the detailed time of the transaction items of the M1 e-wallet;
comparing the time of each transaction item of the CPU e-wallet with the time read above;
adding all transaction items of the CPU e-wallet, after the time read above, to the transaction items of the M1 e-wallet;
the transaction items include a transaction amount, a transaction type IDENTIFICATION, a terminal number, a transaction date and a transaction time etc.

after refreshing the transaction items of the M1 e-wallet, it further includes:

adding, to the off-line transaction serial number of the M1 e-wallet, a value corresponding to the number of the transaction items of the CPU e-wallet being added to the M1 e-wallet, wherein the corresponding value is equal to the number of the items; for example, if the number of the transaction items of the CPU e-wallet being added to the M1 e-wallet is 2, the adding step adds 2 to the off-line transaction serial number of the M1 e-wallet accordingly.

Step 209, determine whether a card-seeking instruction is received, if the card-seeking instruction is not received, wait for receiving the instruction and determining; otherwise, step 201 is executed;

Step 210, receive a wake-up instruction WUPA and a requirement instruction REQA;

Step 211, return an answer instruction ATQA, perform anti-collision operation ANTICOL and then receive the selection instruction SELECT;

Step 212, send Select Acknowledge instruction SAK to the terminal (MIFARE enabled);

Step 213, receive contactless frame;

Step 214, determine whether there is Request for Answer To Select instruction RATS command, if there is not the instruction, step 215 is executed; otherwise, step 216 is executed;

Step 215, execute M1 e-wallet application operation till power-off or the CPU card leaves the contactless inductive area of the terminal;

Step 216, wait for receiving an application instruction.

The embodiment provides a method for synchronizing CPU e-wallet and M1 e-wallet in a CPU card. When being powered on, the CPU card compares balance of the CPU e-wallet with balance of the M1 e-wallet, and replaces the larger balance with the smaller balance, which solves the problem of inconsistence of balance between CPU e-wallet and M1 e-wallet resulted by illegal loading and/or illegal purchase by a user at M1 terminal with the CPU card.

Embodiment 3

The embodiment provides a method for loading CPU e-wallet and M1 e-wallet inside a CPU card at a CPU terminal. After the CPU card enters into the contactless inductive area of a CPU terminal and the CPU terminal establishes connection with a host, the CPU card is powered on, does the above synchronization and performs some application according to user's selection. Particularly, the application selected by the user is a loading application. The embodiment provides a method for loading CPU e-wallet and M1 e-wallet inside a CPU card at a CPU terminal includes steps as below.

Step 301, the terminal displays all applications of a bank for user's selection;

the user chooses an application displayed at the terminal as required, more particularly in the embodiment, the user chooses the loading application.

Step 302, the CPU card sets the current application IDENTIFICATION by the loading application selected by the user and returns an application serial number, corresponding to the application IDENTIFICATION, to the terminal;

Step 303, the terminal forwards the application serial number sent by the CPU card to a host;

Step 304, the host stores the application serial number, corresponding to the CPU card, sent by the terminal;

Step 305, the host obtains a loading slavery key by depriving the above application serial number with the loading master key according to a key identification predetermined with the terminal;

Step 306, the terminal sends loading initialization instruction INITIALIZE FOR LOAD to the CPU card;

Specifically, the loading initialization instruction is applied for initializing the loading transaction.

The message of INITIALIZE FOR LOAD is comprised of instruction head and instruction body, that is: (CLA+INS+P1+P2)+(Lc+Data+Le);

Wherein, CLA+INS+P1+P2 refers to the instruction head, Lc+Data+Le refers to the instruction body, the instruction head is the coding of the instruction, CLA in the instruction head refers to instruction type, INS refers to instruction codes, P1 and P2 refer to instruction parameters. The Lc in the instruction body refers to the length of the data in the instruction body, Le refers to the maximum number of bytes of Data field of expected response APDU.

Data included in DATA field of INITIALIZE FOR LOAD message specifically includes key index number, transaction amount and terminal number.

Step 307, the CPU card receives INITIALIZE FOR LOAD instruction sent by the terminal, reads and stores data in the INITIALIZE FOR LOAD instruction, and determines whether the CPU card supports the key index number included in the INITIALIZE FOR LOAD instruction, if not support, Step 308 is executed; if support, Step 309 is executed.

Step 308, a status code 0x9403 is returned to the terminal and ends executing the instruction;

Step 309, the CPU card generates a pseudo random number, and a processing key with which a first message identifying code MAC1 is obtained by computing;

In particularly, the processing key is obtained by deriving key DLK;

the method for obtaining the first message identifying code MAC1 with the processing key by computing includes steps of linking together balance of the CPU e-wallet, transaction amount, transaction type identification and terminal number in order, encrypting the linked data by the processing key to obtain encrypted data before the transaction, and taking the first four bytes of the encrypted data as the first message identifying code MAC1.

Step 310, the CPU card sends a response message of the INITIALIZE FOR LOAD instruction, which is comprised of DATA+sw1+sw2, to the terminal; Only if the INITIALIZE FOR LOAD instruction is successfully executed, status codes sw1 and sw2 in the response message of the INITIALIZE FOR LOAD instruction, are 9000, and data in Data field of the response message of the INITIALIZE FOR LOAD instruction includes balance of CPU e-wallet before the transaction, online transaction serial number, key version, algorithm identification, pseudo-random number and MAC1; if INITIALIZE FOR LOAD instruction is failed to execute, there are only status codes sw1 and sw2, not valued 9000, in the response message of the INITIALIZE FOR LOAD instruction returned to the terminal by the CPU card.

Step 311, the terminal receives the response message of the INITIALIZE FOR LOAD instruction returned by the CPU card, and determines whether status codes are 9000, if not, ends the transaction; if yes, Step 312 is executed;

Step 312, the terminal sends all response data in the response message of INITIALIZE FOR LOAD instruction to the host;

Step 313, the host receives and stores all response data sent by the terminal, generates a sane processing key with the same method as that used in Step 309 by the CPU card, and determines whether MAC1 in the received response data is valid by using the processing key, if invalid, Step 314 is executed; if valid, Step 315 is executed.

In Step 313, the method of determining whether the received MAC1 is correct using the generated key includes:

linking together balance of the CPU e-wallet, the transaction amount, the transaction type identification and the terminal number in order, encrypting the linked data by the generated processing key, and comparing whether the first four bytes of the encrypted data and MAC1 are the same, if different, determines MAC1 is incorrect; if same, determines MAC1 is correct.

Step 314, the host informs the terminal of refusing the loading transaction, and the transaction is ended;

Step 315, the host subtracts the transaction amount from user's account in a bank, and obtains the second message identifying code MAC2 by computing with the processing key generated in Step 213;

In the embodiment, the method for obtaining the second message identifying code MAC2 by computing with the processing key includes:

linking together the transaction amount, transaction type identification, terminal number, transaction data and transaction time in order, encrypting the linked data with the generated processing key, and taking the first four bytes of the encrypted data as the second message identifying code MAC2.

Step 316, the host adds 1 to the online transaction serial number of the CPU e-wallet, and sends a loading transaction allowing message to the terminal;

In the Step 316, data in Data field of the loading transaction allowing message includes MAC2, the transaction data of the host and the transaction time of the host.

Step 317, the terminal receives the loading transaction allowing message sent by the host, reads and stores data in the loading transaction allowing message and sends the loading instruction CREDIT FOR LOAD to the CPU card.

In the embodiment, loading instruction CREDIT FOR LOAD is used for loading purchase;

instruction message CREDIT FOR LOAD is divided into: instruction head+instruction body.

Specifically, (CLA+INS+P1+P2)+(Lc+Data+Le);

Wherein, the date in the data field of CREDIT FOR LOAD instruction message in particular is transaction date and time of the host and MAC2.

Step 318, the CPU card receives CREDIT FOR LOAD instruction sent by the terminal, reads and stores data in the CREDIT FOR LOAD instruction, and determines whether MAC2 in Data field of the CREDIT FOR LOAD instruction is valid, if MAC2 in Data field of the CREDIT FOR LOAD instruction is invalid, Step 319 is executed; otherwise, Step 320 is executed;

Specifically, the method of determining whether the MAC2 is correct includes:

linking together the transaction amount, transaction type identification, terminal number, transaction date and transaction time in order, encrypting the linked data by the processing key generated in Step 309, and comparing whether the first four bytes of the encrypted data and MAC2 in Data field of the CREDIT FOR LOAD instruction are the same, if different, MAC2 is incorrect; if same, MAC2 is correct.

Step 319, the CPU card returns status code 0x9302 to the terminal, prompts MAC2 invalid and ends the loading operation;

Step 320, the CPU card adds 1 to the online transaction serial number of the CPU e-wallet, and adds the transaction amount to balance of the CPU e-wallet;

Specifically, the method of adding the transaction amount to balance of the CPU e-wallet includes:

retrieving address of the application file ADF;

retrieving address of CPU e-wallet in ADF by the application file ADF;

obtaining, by computing, address where balance of the CPU e-wallet is stored with retrieved address of CPU e-wallet and the predetermined offset of balance of the predetermined CPU e-wallet;

reading data in the storage area to which the above address points, adding the transaction amount to the data read, replacing the added data with the read data, and taking the added data as new balance of the CPU e-wallet;

and a further step can be included, after adding the transaction amount to balance of the CPU e-wallet, of refreshing transaction items of the CPU e-wallet;

the transaction items of the CPU e-wallet to be refreshed include transaction amount, transaction type identification, terminal number, transaction date of the host and transaction time of the host, more practically, the CPU card links the transaction amount, transaction type identification, terminal number, transaction date of the host and transaction time of the host in order to obtain a record for refreshing.

Step 321, the CPU card obtains the section key of M1 e-wallet;

specifically, the section number and block number of the storage area for storing the balance of the M1 e-wallet are predetermined, and the section key of M1 e-wallet is obtained by the predetermined section number; and more practically, the method for the CPU card to obtain the section key of M1 e-wallet is invoking interface function extern WORD GetMifareSectorPassword (BYTE*secPwdBuf, BYTE blockNo) to obtain the section number of M1 e-wallet.

Step 322, the CPU card adds 1 to the online transaction serial number of M1 e-wallet, and sets balance of M1 e-wallet viz. replaces the refreshed balance of CPU e-wallet in Step 320 with balance of M1 e-wallet;

Specifically, method for the CPU card to set balance of M1 e-wallet includes invoking API interface function extern BYTE SetMifarePurseBalance (BYTE*balanceBuf), setting balance of M1 e-wallet by the section key obtained in Step 321 viz. replacing balance of M1 e-wallet with the refreshed balance of the CPU e-wallet.

After setting balance of M1 e-wallet, a further step can be included of refreshing the transaction items of M1 e-wallet;

Particularly, adding the refreshed transaction items of CPU e-wallet in Step 320 to the transaction items of M1 e-wallet;

The transaction items include transaction amount, transaction type identification, terminal number, transaction date and transaction time etc.

Step 323, the CPU card performs XOR operation on 8 bytes on the right and left of DTK, and obtains transaction authenticating code TAC by computing the result obtained from the XOR operation.

Specifically, obtaining TAC by computing the result obtained by the XOR operation is:

linking together balance of CPU e-wallet or M1 wallet after the transaction, the online transaction serial number of CPU card before adding 1, transaction amount, transaction type identification, terminal number, transaction date and time of the host in order, encrypting linked data by the result obtained by XOR operation, and taking the first four bytes of the encrypted data as TAC.

Step 324, the CPU card takes TAC as Data field of the response message of CREDIT FOR LOAD instruction, and sends it to the terminal;

Step 325, the terminal receives the response message of the CREDIT FOR LOAD instruction and stores TAC, and then the transaction is ended.

In the Step 325, TAC can be authenticated after being stored by the terminal or later.

The embodiment provides a method for loading CPU e-wallet and M1 e-wallet of the CPU card at a CPU terminal synchronously, eliminating the security risk of loading e-wallet at M1 terminal in prior art and improving the loading security.

Embodiment 4

The embodiment provides a method for purchase with CPU e-wallet and M1 e-wallet inside a CPU card at a CPU terminal. In the embodiment, the CPU card comes to the contactless inductive area of the CPU terminal, and when being powered on, the CPU card synchronizes the CPU e-wallet and the M1 e-wallet according to steps in embodiment 2. Specifically in the embodiment, a purchase application is selected by a user, and thus the method herein is a method for purchase with CPU e-wallet and M1 e-wallet in a CPU card at a CPU terminal, in which when the CPU terminal uses the CPU e-wallet for purchase, transaction amount can be subtracted only from balance of CPU e-wallet, rather than from balance of M1 e-wallet, and then the synchronizing step is realized by subtracting the transaction amount from balance of M1 e-wallet when the CPU card is powered on later. More practically, the synchronizing step is realized by subtracting the transaction amount from balance of both the CPU e-wallet and the M1 e-wallet synchronously.

The method includes steps as below.

Step 401, a terminal sends purchase initialization instruction INITIALIZE FOR PURCHASE, for initializing purchase transaction, to the CPU card;

The INITIALIZE FOR PURCHASE instruction message is divided into: instruction head+instruction body That is: (CLA+INS+P1+P2)+(Lc+Data+Le);

Wherein, CLA+INS+P1+P2 refers to the instruction head, Lc+Data+Le refers to the instruction body, the instruction head is the coding of the instruction, CLA in the instruction head refers to instruction type, INS refers to instruction codes, P1 and P2 refer to instruction parameters. The Lc in the instruction body refers to the length of the data in the instruction body, Le refers to the maximum number of bytes of Data field of expected response APDU.

Data in Data field of INITIALIZE FOR PURCHASE instruction message includes key index number, transaction amount and terminal number.

Step 402, the CPU card receives the INITIALIZE FOR PURCHASE instruction sent by the terminal, reads and stores data in the above instruction, and determines whether the CPU card supports the key index number included in the INITIALIZE FOR PURCHASE instruction, if not support, Step 403 is executed; otherwise, if support, Step 404 is executed.

Step 403, a status code 0x9403 is returned to the terminal and ends execution of the instruction.

Step 404, the CPU card reads balance of CPU e-wallet and compares the transaction amount included in the INITIALIZE FOR PURCHASE instruction with balance of CPU e-wallet in size, if a match is found, Step 405 is executed; otherwise, Step 406 is executed.

In step 404, the method for reading balance of CPU e-wallet includes steps of
retrieving address of the application file ADF;
retrieving address of the CPU e-wallet file in ADF by the application file ADF;
obtaining the address where balance of the CPU e-wallet is stored by computing in accordance with the retrieved address of CPU e-wallet file and the predetermined offset of balance of CPU e-wallet;
reading balance of the CPU e-wallet in accordance with address where balance of CPU e-wallet is stored by computing.

Step 405, the CPU card returns a status code 0x9401 to the terminal and ends the instruction;

Step 406, the CPU card generates a pseudo-random number, and a processing key, obtained by key DPK derivation, for purchase transaction of CPU e-wallet or M1 e-wallet;

Step 407, the CPU card sends a response message of the INITIALIZE FOR PURCHASE instruction to the terminal;

Wherein, the response message of the INITIALIZE FOR PURCHASE instruction is comprised of Data+sw1+sw2, Only if the INITIALIZE FOR PURCHASE instruction is successfully executed, status codes sw1 and sw2 in the response message of the INITIALIZE FOR LOAD instruction, returned to the terminal by the CPU card, are 9000, and data in Data field of the response message of the INITIALIZE FOR PURCHASE instruction includes pseudo-random number generated in Step 406 by the CPU card and the offline transaction serial number of CPU e-wallet; if INITIALIZE FOR PURCHASE instruction is failed to execute, there are only status codes sw1 and sw2, not valued 9000, in the response message of the INITIALIZE FOR PURCHASE instruction returned to the terminal by the CPU card.

Step 408, the terminal receives the response message of INITIALIZE FOR PURCHAS instruction returned by the CPU card and determines whether the status code is 9000, if not, the terminal ends the transaction; if yes, Step 409 is executed;

Step 409, the terminal generates a processing key with the same method with which the CPU card generates a same processing key, with the pseudo random number in DATA field of the response message of the INITIALIZE FOR PURCHASE instruction and the offline transaction serial number of CPU e-wallet, and obtains, by computing, a third message identifying code MAC3.

In the embodiment, the method for obtaining the third message identifying code MAC3 in particular is:
linking together the transaction amount, transaction type identification, terminal number, terminal transaction date and terminal transaction time in order, encrypting the linked data with the generated processing key, and taking the first four bytes of the encrypted data as the third message identifying code MAC3.

Step 410, the terminal sends DEBIT FOR PURCHASE WITHDRAW instruction to the CPU card;

DEBIT FOR PURCHASE WITHDRAW instruction message is divided into: instruction head+instruction body That is: (CLA+INS+P1+P2)+(Lc+Data+Le);

Wherein, data in Data field of DEBIT FOR PURCHASE WITHDRAW message in particular is transaction serial number, transaction data, transaction time of the terminal and MAC3.

Step 411, the CPU card receives DEBIT FOR PURCHASE WITHDRAW instruction, reads and stores data in the instruction, and determines whether MAC3 in Data field of DEBIT FOR PURCHASE WITHDRAW instruction is valid, if invalid, Step 412 is executed; if valid, Step 413 is executed;

In the embodiment, the method for determining whether MAC3 in Data field of DEBIT FOR PURCHASE WITHDRAW instruction is valid in particular is:

the CPU card links together the transaction amount, transaction type identification, terminal number, transaction date and time of the terminal in order, encrypts the linked data with the processing key generated in Step 406, and compares whether the first four bytes of the encrypted data and MAC3 in Data field of DEBIT FOR PURCHASE WITHDRAW instruction are same, if different, MAC3 is invalid; if same, MAC3 is valid.

Step 412, a status code 0x9302 is returned to the terminal and ends the transaction;

Step 413, the CPU card adds 1 to the offline transaction serial number of CPU e-wallet, and subtracts the transaction amount from balance of CPU e-wallet.

In the Step 413, the method for subtracting the transaction amount from balance of CPU e-wallet includes:

retrieving the address of the application file ADF;

retrieving the address of CPU e-wallet file in ADF with the application file ADF;

obtaining the address where balance of CPU e-wallet is stored by computing with the retrieved address of CPU e-wallet and the predetermined offset of balance of CPU e-wallet;

reading data from storage area to which the above address points, subtracting the transaction amount from the read data, replacing the data from storage area to which the above address points with the difference value obtained by subtracting, and taking the difference value by the subtracting as balance of CPU e-wallet;

after subtracting the transaction amount from balance of CPU e-wallet, a further step is included of refreshing the transaction items, of CPU e-wallet, which comprise transaction amount, transaction type identification, terminal number, transaction date and time of the terminal, and specifically the refreshing step is linking together the transaction amount, transaction type identification, terminal number, transaction date and time of the terminal in order into a record for refreshing Step 414, the CPU card obtains a section key of M1 e-wallet;

specifically, section number and block number of the storage area for storing the balance of M1 e-wallet are predetermined, and the section key of M1 is obtained by the predetermined section number that is realized by invoking API interface function extern WORD GetMifareSectorPassword (BYTE*secPwdBuf, BYTE blockNo) to obtain the section key of M1.

Step 415, the CPU card adds 1 to the offline transaction serial number to the M1 e-wallet, and sets balance of M1 e-wallet viz. replaces balance of M1 e-wallet with the refreshed balance of CPU e-wallet;

Specifically, the method for setting balance of M1 e-wallet by CPU card is invoking the API interface function extern BYTE SetMifarePurseBalance (BYTE*balanceBuf) and setting balance of M1 e-wallet with the section key obtained in Step 414 viz. replacing balance of M1 e-wallet with the refreshed balance of CPU e-wallet in Step 413;

after setting balance of M1 e-wallet, a further step can be included of refreshing the transaction items of M1 e-wallet, which is adding the transaction items of CPU e-wallet refreshed in Step 413 to the transaction items of M1 e-wallet, and specifically the transaction items include transaction amount, transaction type identification, terminal number, transaction date and time of the terminal etc.

Step 416, the CPU card generates a fourth message identifying code MAC4 by steps of encrypting transaction amount with the processing key generated in Step 406 and taking the first fourth bytes of the encrypted data as the fourth message identifying code MAC4.

Step 417, perform XOR operation on the 8 bytes on the left and on the right of DTK, and obtain the transaction identifying code TAC by the result obtained from the XOR operation, specifically which is linking together the transaction amount, transaction type identification, terminal number, transaction serial number, date and time of the terminal in order, and encrypting the linked data with the result from the XOR operation, and taking the first fourth bytes of the encrypted data as TAC.

Step 418, the CPU card sends the response message of DEBIT FOR PURCHASE WITHDRAW instruction to the terminal; Wherein, the response message of DEBIT FOR PURCHASE is comprised of Data+sw1+sw2.

The data field of the response message of DEBIT FOR PURCHASE includes MAC2 and TAC code.

Step 419, the terminal receives the response message of DEBIT FOR PURCHASE WITHDRAW instruction sent by the CPU card and determines whether MAC4 included in Data field of the response message of INITIALIZE FOR PURCHASE instruction is valid, if invalid, Step 420 is executed; if valid, Step 421 is executed.

Step 420, the terminal enters into the defined exception handling procession;

Step 421, the transaction ends normally.

The embodiment provides a method of purchase at a CPU terminal, in which the CPU card not only subtracts transaction amount from balance of CPU e-wallet, but also does the same subtraction to balance of M1 e-wallet when performing purchase operation at CPU terminal, which ensures the same balance reserved in both CPU e-wallet and M1 e-wallet by setting the balance of CPU e-wallet to be the same with balance of M1 e-wallet.

Embodiment 5

The embodiment provides a method for operating both CPU e-wallet and M1 e-wallet inside the CPU card at CPU terminal, in the embodiment, the CPU card with CPU e-wallet and M1 e-wallet is a contactless CPU card and the CPU terminal is a contactless terminal, comprising steps as follows.

Step 501, A CPU card comes to the contactless inductive area of a terminal, is powered on and initialized;

Step 502, the CPU card determines whether it has been personalized, viz. whether the personalization flag inside of it is 0xAA, if the personalization flag is 0xAA, Step 503 is executed; otherwise, Step 509 is executed.

In the embodiment, the personalization flag is predetermined by a card distributing system and the CPU card. If the card distributing system has personalized the CPU card, the card distributing system will set a personalization flag in the CPU card and a predetermined value for the flag. Specifically the predetermined value is defined as 0xAA, and if the personalization flag is 0xAA, it means that the CPU card has been personalized; otherwise it means that the CPU card has not been personalized.

or, the card distributing system predetermines with the CPU card that if the card distributing system has personalized the CPU card, the card distributing system creates a main file MF for the file system, and if the CPU card determines the main file MF of the file system available inside, it means that the CPU card has been personalized; or if the CPU card determines the main file MF of the file system not available inside, it means the CPU card has not been personalized;

or, the card distributing system predetermines with the CPU card that if the card distributing system has personalized the CPU card, the card distributing system creates an identification file in main file of the file system in CPU card, and if the CPU card determines an identification file available inside, it means the CPU card has been personalized; or else if the CPU card determines an identification file not available inside, it means that the CPU card has not been personalized.

Step 503, obtain the section key of M1;

In the embodiment, section number and block number of the storage area for storing the balance of the M1 e-wallet is predetermined, and section key of M1 is obtained by the predetermined section number; specifically, the method for the CPU card to obtain the section key of M1 is invoking an interface function extern WORD GetMifareSectorPassword (BYTE*secPwdBuf, BYTE blockNo) to obtain the section number of M1.

Step 504, obtain balance of M1 e-wallet;

In the embodiment, the CPU card obtains balance of M1 e-wallet with the section key of M1, obtained in Step 103, and predetermined block number of the storage area for storing the balance of e-wallet, more practically, that is invoking API interface function extern BYTE GetMifarePurseBalance (BYTE*balanceBuf) to obtain balance of M1 e-wallet.

Step 505, obtain balance of CPU e-wallet,

In the embodiment, the method of obtaining balance of CPU e-wallets includes:

retrieving address of the application file ADF, retrieving address of CPU e-wallet file of ADF with the application file ADF;

obtaining, by computing, address, where balance of CPU e-wallet is stored, with the retrieved address of CPU e-wallet file and the predetermined offset of balance of CPU e-wallet;

and obtaining balance of CPU e-wallet with the address where balance of CPU e-wallet is stored; or reading the address from where predetermined in the CPU card for storing the address of balance of CPU e-wallet, and by the read address reading balance of CPU e-wallet.

Step 506, synchronize M1 e-wallet and CPU e-wallet, viz. compare balance of M1 e-wallet with that of CPU e-wallet, if balance of M1 e-wallet is smaller than balance of CPU e-wallet, Step 507 is executed; or else if balance of M1 e-wallet is larger than balance of CPU e-wallet, Step 508 is executed; or else if balance of M1 e-wallet equals to that of CPU wallet, Step 509 is executed.

Step 507, set balance of CPU e-wallet to be balance of M1 e-wallet, and then Step 509 is executed;

In the Step 507, the method of setting balance of CPU e-wallet to be balance of M1 e-wallet includes:

retrieving address of the application file ADF;

retrieving address of CPU e-wallet file of ADF with the application file ADF;

obtaining, by computing, address, where balance of CPU e-wallet is stored, with the retrieved address of CPU e-wallet file and the predetermined offset of balance of CPU e-wallet; and clearing data in the storage area to which the above address points, writing balance of M1 e-wallet to the storage area, to which the above address points, and taking the data written as new balance of CPU e-wallet; or obtaining address where balance of CPU e-wallet is stored, from the predetermined storage area;

clearing data in the storage area to which the above address points, writing balance of M1 e-wallet to the storage area to which the above address points, and taking the written balance of M1 e-wallet as new balance of CPU e-wallet;

Step 507 further includes refreshing the transaction items of CPU e-wallet, that includes steps of reading the detailed time of the last transaction item of CPU e-wallet;

comparing the detailed time of each transaction item of M1 e-wallet one by one with the time read above;

adding the transaction items of M1 e-wallet after the time read above, to the transaction items of CPU e-wallet;

and the transaction items refer to transaction amount, transaction type id, terminal number, transaction date and time etc.

after refreshing the transaction items of CPU e-wallet, Step 507 further includes a step of adding a value to the offline transaction serial number of CPU e-wallet according to number of transaction items of M1 e-wallet being added to CPU e-wallet, in which the value corresponding to the number of transaction items, for example, if the above number of transaction items is three, the further step will be adding 3 to the offline transaction serial number of CPU e-wallet.

Step 508, set balance of M1 e-wallet to be the same with that of CPU e-wallet, and Step 509 is executed;

In the Step 508, the method of setting balance of M1 e-wallet to be the same with that of CPU e-wallet in particular is invoking API interface function extern WORD GetMifareSectorPassword (BYTE*secPwdBuf, BYTE blockNo) to obtain the section key of M1 e-wallet with the predetermined section number;

invoking API interface function extern BYTE SetMifarePurseBalance (BYTE *balanceBuf) and setting balance of M1 e-wallet by the section key of M1 e-wallet viz. setting balance of M1 e-wallet to be the same with that of CPU e-wallet.

In Step 508, the setting balance of M1 e-wallet to be the same with that of CPU e-wallet further includes steps of reading time of the last transaction item of M1 e-wallet; comparing time of each transaction item of CPU e-wallet subsequently with the time read above; and adding all transaction items, after the time read above, of CPU e-wallet to transaction items of M1 e-wallet, in which the transaction item refers to transaction amount, transaction type id, terminal number, date and time of transaction etc.

After refreshing transaction items of M1 e-wallet, a further step is included of adding a value to the offline transaction serial number of M1 e-wallet according to number of transaction items of CPU e-wallet being added to M1 e-wallet, the value corresponding to the number of transaction items, for example, if the above number of transaction items is one, the further step will be adding one to the offline transaction serial number of M1 e-wallet.

Step 509, determine whether a card-seeking instruction is received, if not, continue to wait for receiving the instruction and determines, if yes, Step 510 is executed;

Step 510, receive WAKE-UP instruction WUPA and REQUEST instruction REQA;

Step 511, return answer instruction ATQA, perform anti-collision operation ANTICOL, and then receive SELECT instruction;

Step 512, send the Select AcKnowledge instruction SAK (MIFARE enabled);

Step 513, receive the contactless Frame;

Step 514, determine whether the Request for Answer To Select instruction RATS command is selected, if the instruction is selected, Step 515 is executed; otherwise, Step 516 is executed;

Step 515, perform application operation on M1 e-wallet till shut-down or the CPU card leaves the contactless inductive area;

Step 516, wait for receiving an application instruction, if the received is INITIALIZE FOR LOAD instruction, Step 517 is executed; or else, if the received is INITIALIZE FOR PURCHASE instruction, Step 532 is executed;

In the embodiment, the INITIALIZE FOR LOAD instruction is for initializing a loading transaction.

Step 517, read and stores data, included in the INITIALIZE FOR LOAD instruction, which refers to key indexing number, transaction amount and terminal number.

Step 518, determine whether the key indexing number included in the INITIALIZE FOR LOAD instruction is supported, if the key indexing number is supported, Step 519 is executed; otherwise Step 520 is executed;

Step 519, a status code 0x9403 is returned to the terminal, end the INITIALIZE FOR LOAD operation, and return to Step 516;

Step 520, generate a pseudo-random-number and a processing key, obtain a first message identifying code MAC1 by the processing key.

In the embodiment, the processing key is derived from key DLK;

The method of obtaining specifically is:

linking together balance of CPU e-wallet before a transaction, transaction amount, transaction type id and transaction number in order, encrypting the linked data by the processing key, taking the first fourth bytes of the encrypted data as MAC1.

Step 521, return a response message of INITIALIZE FOR LOAD instruction, to the terminal;

Wherein, the response message of INITIALIZE FOR LOAD is comprised of Data+sw1+sw2.

Only if both the status codes sw1 and sw2 in the response message of the INITIALIZE FOR LOAD instruction are 9000, it means a successful execution of INITIALIZE FOR LOAD instruction, data in the data field of the response message of the INITIALIZE FOR LOAD instruction includes balance of CPU e-wallet before the transaction, online transaction serial number, key version, algorithm identification, pseudo-random number and MAC1, if INITIALIZE FOR LOAD instruction is failed, there are only status codes sw1 and sw2, not valued 9000, in the response message of the INITIALIZE FOR LOAD instruction returned to the terminal.

Step 522, receive the CREDIT FOR LOAD instruction sent by the terminal, read and store data in the CREDIT FOR LOAD instruction.

In the embodiment, the CREDIT FOR LOAD instruction is used for loading transaction;

Wherein, data in the CREDIT FOR LOAD instruction in particular is transaction date, time and a second message identifying code MAC2.

Step 523, authenticate validation of MAC2 by the processing key generated in Step 520, if MAC2 is valid, Step 524 is executed; otherwise, Step 525 is executed;

In the embodiment, the method of authenticating whether MAC2 is valid includes:

linking together the transaction amount, transaction type identification, terminal number, transaction date and time in order, encrypting the linked data by the processing key generated in Step 520, comparing whether the first fourth bytes of the encrypted data and MAC2 in the data field of CREDIT FOR LOAD instruction are the same, if different, MAC2 is valid; if same, MAC2 is invalid.

Step 524, return a status code 0x9302 to the terminal, prompt that MAC2 is invalid, end the loading operation, and return to Step 516;

Step 525, add 1 to the online serial number of CPU e-wallet and add the transaction amount to balance of the CPU e-wallet;

In the embodiment, the method of adding the transaction amount to balance of the CPU e-wallet includes:

retrieving address of the application data file ADF;

retrieving address of CPU e-wallet file of ADF with the application file ADF;

obtaining, by computing, address where balance of CPU e-wallet is stored, with the retrieved address of CPU e-wallet file and the predetermined offset of balance of CPU e-wallet;

reading data in the storage area to which the obtained address for storing balance of the CPU e-wallet points, adding the transaction amount to the read data, replacing the read data with the added data, and taking the added data as balance of the CPU e-wallet.

Step 526, refresh transaction items of CPU e-wallet;

In the embodiment, the transaction items of CPU e-wallet need to be refreshed in particular is transaction amount, transaction type id, terminal number, transaction date and transaction time, more particularly, CPU card link together the transaction amount, transaction type identification, terminal number, date and time of the transaction in order for refreshing.

Step 527, obtain the section key of M1 e-wallet;

In the embodiment, the CPU card obtains balance of M1 e-wallet with the section key of M1, wherein, obtain the section key of M1 e-wallet in special is invoking API interface function extern WORD GetMifareSectorPassword (BYTE*secPwdBuf, BYTE blockNo), more particularly, the section number and block number of M1 e-wallet are pre-stored and by the section number the section key is obtained;

Step 528, add 1 to the online transaction serial number of M1 e-wallet, refresh balance of M1 e-wallet viz. replaces balance of M1 e-wallet with that of CPU e-wallet in Step 525, which specifically includes steps of invoking API interface function extern BYTE SetMifarePurseBalance (BYTE*balanceBuf), and setting balance of M1 e-wallet with the section key obtained, viz. replacing balance of M1 e-wallet with the refreshed balance of CPU e-wallet in Step 525;

Step 529, refresh transaction items of M1 e-wallet;

More particularly, adding the refreshed transaction items of CPU e-wallet in step 526 to transaction items of M1 e-wallet;

the transaction item includes transaction amount, transaction type id, terminal number, transaction date and time etc.

Step 530, perform XOR operation on 8 bytes on the left and on the right of DTK, and obtain transaction authenticating code TAC by computing the result from XOR operation;

the TAC code specifically is obtained by linking together balance of CPU e-wallet or M1 e-wallet after a transaction, the online transaction serial number, transaction amount, transaction type identification, terminal number, transaction date and time of the CPU card before adding 1 in order, encrypting the linked data with the result from XOR operation, and taking the first fourth 4 bytes of the encrypted data as TAC code.

Step 531, return a response message of the CREDIT FOR LOAD instruction, to the terminal, end the transaction, and return to Step 516, wherein, the response message of the CREDIT FOR LOAD instruction include TAC code;

Step 532, read and store data, in INITIALIZE FOR PURCHASE instruction for initializing the purchase transaction, which includes the key index, transaction amount and terminal number.

Step 533, determine whether it supports the index number, included in the INITIALIZE FOR PURCHASE instruction, if not, Step 534 is executed; if yes, Step 535 is executed;

Step 534, return a status code 0x9403 to the terminal, end INITIALIZE FOR PURCHASE operation, and return to Step 516;

Step 535, read balance of CPU e-wallet and determine whether the value of transaction amount included in the INITIALIZE FOR PURCHASE instruction is larger than the value of transaction amount of CPU e-wallet, if yes, Step 536 is executed; if not, Step 537 is executed;

Specifically, in Step 535, the reading step includes:
retrieving address of the application file ADF;
retrieving address of CPU e-wallet file of ADF with the application file ADF;
obtaining, by computing, address where balance of CPU e-wallet is stored with the retrieved address of CPU e-wallet file and the predetermined offset of balance of CPU e-wallet;
and reading balance of CPU e-wallet with the obtained address where balance of CPU e-wallet is stored.

Step 536, return a status code 0x9401 to the terminal, end the initialization for purchase operation, and return to Step 516;

Step 537, generate a pseudo random number, and a processing key for purchase transaction of CPU e-wallet and M1 e-wallet, which is derived by DPK key.

Step 538, send the response message of the INITIALIZE FOR PURCHASE instruction to the terminal;

Wherein, the response message of the INITIALIZE FOR PURCHASE instruction is comprised of Data+sw1+sw2;

only if the INITIALIZE FOR PURCHASE instruction is successfully executed, the value of the status codes sw1 and sw2 in the response message of the INITIALIZE FOR PURCHASE instruction returned to the terminal by the CPU card are 9000, and the data included in DATA field of response message of the INITIALIZE FOR PURCHASE instruction includes pseudo random number and offline serial number of CPU e-wallet; otherwise, only sw1 and sw2, which are not 9000 in value, are included in the response message of the INITIALIZE FOR PURCHASE instruction.

Step 539, receive the DEBIT FOR PURCHASE WITHDRAW purchase instruction sent by the terminal, read and store data, including transaction serial number, transaction date and time of the terminal and the third identification code MAC3, in DEBIT FOR PURCHASE WITHDRAW instruction.

Step 540, determine whether MAC3 included in the DEBIT FOR PURCHASE WITHDRAW instruction is valid with the processing key generated in Step 537, if invalid, Step 141 is executed; if valid, Step 542 is executed;

Specifically, in Step 540, the determining step includes steps of linking together the transaction amount, transaction type identification, terminal number, transaction date and time of the terminal in order, encrypting the linked data by the processing key generated in Step 537, and comparing whether the first fourth bytes of encrypted data and MAC3 included in the DEBIT FOR PURCHASE WITHDRAW instruction are same, if not same, MAC3 is invalid; if same, MAC3 is invalid.

Step 541, return a status code 0x9302 to the terminal, end the transaction and returns to Step 516;

Step 542, add 1 to the offline transaction serial number of CPU e-wallet, and subtract the transaction amount from balance of the CPU e-wallet;

the subtracting includes steps of retrieving address of the application file ADF;
retrieving address of CPU e-wallet file of ADF with the application file ADF;
obtaining, by computing, address where balance of CPU e-wallet is stored with the retrieved address of CPU e-wallet file and the predetermined offset of balance of CPU e-wallet;
reading data from where the obtained address of balance of CPU e-wallet points, replacing the data read, with the difference value by the data read minus the transaction amount, and taking the difference value as the new balance of CPU e-wallet.

Step 543, refresh the transaction items of CPU e-wallet;

In the embodiment, the transaction items of CPU e-wallet in particular is transaction amount, transaction type identification, terminal number, transaction date and time, Particularly, CPU card link together the transaction amount, transaction type identification, terminal number, transaction date and time in order for refreshing by the CPU card.

Step 544, obtain the section key of M1 e-wallet;

In the embodiment, pre-stores section number and block number of the storage area for storing the balance of M1 e-wallet and according to the section number, the section key of M1 e-wallet is obtained, which in practice is realized by invoking API interface function extern WORD GetMifareSectorPassword (BYTE*secPwdBuf, BYTE blockNo).

Step 545, add 1 to the offline transaction serial number of M1 e-wallet, and refresh balance of M1 e-wallet, viz. replace balance of M1 e-wallet with that of CPU e-wallet refreshed in Step 542;

In the embodiment, the refreshing step includes steps of invoking API function extern BYTE SetMifarePurseBalance (BYTE*balanceBuf), setting balance of M1 e-wallet by the section key obtained in Step 544, viz. replacing balance of M1 e-wallet with that of CPU e-wallet refreshed in Step 542.

Step 546, refresh the transaction items of M1 e-wallet;

Particularly, adding the transaction items of CPU e-wallet refreshed in Step 543 to the transaction items of M1 e-wallet;

the transaction item includes transaction amount, transaction type identification, terminal number, transaction date and time etc.

Step 547, generate a fourth message identifying code MAC4;

In the embodiment, generate a fourth message identifying code MAC4 in particular is encrypting the transaction amount with the processing key generated in Step 537 and takes the first fourth bytes of the encrypted data as the fourth message identifying code MAC4.

Step 548, perform XOR operation on eight bytes on the left and on the right of DTK, and obtain the transaction authenticating code TAC by the result of XOR operation;

In the embodiment, the method of computing the TAC code using the result obtained by XOR operation in particular is link together the transaction amount, transaction type identification, terminal number, transaction serial number of terminal, transaction date and time of terminal in order, encrypting the linked data by the result of XOR operation and taking the first fourth bytes of the encrypted data as TAC code.

Step 549, return the response message of the DEBIT FOR PURCHASE WITHDRAW instruction, to the terminal, end the transaction and returns to Step 516, Wherein, the data included in the response message of the INITIALIZE FOR PURCHASE instruction are MAC2 and TAC.

The embodiment provides a method for operating both the CPU e-wallet and M1 e-wallet inside a CPU card at a CPU terminal, synchronization between the CPU e-wallet and M1 e-wallet ensures that the same balance is gained in the CPU e-wallet and M1 e-wallet, and therefore it solves the difference in balance of CPU e-wallet and M1 e-wallet resulted by invalid loading and/or purchase at a M1 terminal by the CPU card; loading both the CPU e-wallet and M1 e-wallet inside the CPU card at a CPU terminal by the CPU card only after a loading instruction is received, improves security of the loading; and purchasing with the CPU e-wallet and M1 e-wallet inside the CPU card at the CPU terminal upon receiving a purchasing instruction by the CPU card, viz. subtracting the corresponding transaction amount from balance of CPU e-wallet at the same time doing the same subtraction to balance of the M1 e-wallet, ensures the consistency in balance of the two e-wallets.

The described above are only preferred embodiments of the invention, not limitation to the invention, any modification, substitution and improvement in principle of the invention will be protected by the invention.

The invention claimed is:

1. A computer-implemented method for loading double e-wallets at a CPU terminal, the method comprising:

in response to entering a contactless inductive area of the CPU terminal, a CPU card establishing a connection with the CPU terminal, wherein the CPU card has memory and one or more processors and comprises a first e-wallet and a second e-wallet, wherein the first e-wallet is a banking application and the second e-wallet is a CPU e-wallet, wherein a section number and a block number of a storage area in the logical cipher card part of the CPU card are predetermined, wherein the storage area is used to store a balance of the first e-wallet wherein the first e-wallet is a M1™ e-wallet and the second e-wallet is a CPU e-wallet, the M1™ e-wallet and the second e-wallet are in the CPU card;

in response to power-on and initialization, the CPU card synchronizing the first e-wallet and the second e-wallet, and waiting to receive an instruction from the terminal, wherein synchronizing the first e-wallet and the second e-wallet by the CPU card comprises:

obtaining a balance of the first e-wallet by the CPU card;
obtaining a balance of the second e-wallet by the CPU card;
comparing the balance of the first e-wallet with the balance of the second e-wallet by the CPU card;
if the balance of the first e-wallet is smaller than the balance of the second e-wallet, setting the balance of the second e-wallet to be the balance of the first e-wallet, and then continuing to seek a card by the CPU card;
if the balance of the second e-wallet is smaller than the balance of the first e-wallet, setting the balance of the first e-wallet to be the balance of the second e-wallet, and then continuing to seek a card by the CPU card; and
if the balance of the second e-wallet equals to the balance of the first e-wallet, continuing to seek a card by the CPU card;
the terminal sending an INITIALIZE FOR LOAD instruction to the CPU card;
in response to receiving the INITIALIZE FOR LOAD instruction, the CPU card executing a load initialization operation and returning a response message to the terminal;
in response to receiving the response message of the INITIALIZE FOR LOAD instruction from the CPU card, the terminal sending data in the response message of the INITIALIZE FOR LOAD instruction to a host;
in response to receiving and storing the data, the host sending a LOAD purchase allowing message to the terminal;
in response to receiving the LOAD purchase allowing message, the terminal sending a LOAD instruction to the CPU card;
in response to receiving the LOAD instruction, the CPU card performing a loading operation on the first e-wallet and the second e-wallet at the terminal, refreshing the balance of the first e-wallet stored in the storage area, and returning a response message for the LOAD instruction to the terminal; and
in response to receiving the response message for the LOAD instruction, the terminal ending loading double e-wallets.

2. The computer-implemented method for loading double e-wallets of claim 1, wherein before the CPU card enters the contactless inductive area of the terminal, the method further comprises:

personalizing a logical cipher card part and a CPU part inside the CPU card, respectively, and setting a personalization flag, by a card-distributing system of the CPU card;
writing a section access key of a section, in which the first e-wallet in the logical cipher card part is located, to the CPU part of the CPU card; and
setting the personalization flag in the CPU card to be a first identification;
or,
personalizing the logical cipher card part and the CPU part in the CPU card, respectively, and creating an identification file, by the card-distributing system of the CPU card; and
writing a section access key of the section, in which the first e-wallet in the logical cipher card part is located, to the CPU part of the CPU card.

3. The computer-implemented method for loading double e-wallets of claim 1, wherein before the CPU card synchronizes the first e-wallet and the second e-wallet, the method further comprises:

determining whether a personalization flag is a predetermined identification or whether there is an identification file inside of the CPU card, by the CPU card;
if not, waiting to receive the instruction from the terminal without synchronizing the first e-wallet and the second e-wallet, by the CPU card; and
if yes, synchronizing the first e-wallet and the second e-wallet, and then waiting for the instruction from the terminal, by the CPU card.

4. The computer-implemented method for loading double e-wallets of claim 1, wherein executing a load initialization operation by the CPU card comprises:

reading and storing data in the INITIALIZE FOR LOAD instruction by the CPU card, wherein the data comprises a key index number and a transaction amount;
determining, by the CPU card, whether the key index number is supported by the CPU card;
if not supported, returning an fault message to the terminal, and ending the load initialization operation; and
if supported, generating a pseudo random number and a processing key, and computing to obtain a first message identifying code using the processing key.

5. The computer-implemented method for loading double e-wallets of claim 1, wherein performing a loading operation on the second e-wallet, by the CPU card, comprises:

reading and storing data in the LOAD instruction, wherein the data comprises a second message identifying code;
determining whether the second message identifying code is valid using a processing key;
if invalid, returning mi invalid information of the second message identifying code to the terminal and ending the loading operation; and if valid, adding a transaction amount to a balance of the second e-wallet.

6. The computer-implemented method for loading double e-wallets of claim 5, wherein adding the transaction amount to the balance of the second e-wallet comprises:
retrieving an address of an application file;
retrieving an address of a file of the second e-wallet in the application file according to the application file;
computing an address where the balance of the second e-wallet is stored according to the retrieved address of the second e-wallet file and a predetermined offset of the balance of the second e-wallet; and
reading data in a storage area to which the computed address of the balance of the second e-wallet points, adding the transaction amount to the read data, replacing the data in the storage area to which the computed address of the balance of the second e-wallet points with the added data, and taking the added data as new balance of the second e-wallet.

7. The computer-implemented method for loading double e-wallets of claim 1, wherein refreshing balance of the first e-wallet comprises setting the balance of the first e-wallet to be a balance of the second e-wallet, comprising:
invoking a function to obtain a section key of the first e-wallet according to a section number of a storage area for storing the balance of the first e-wallet in a logical cipher card part of the CPU card; and
invoking a function to set the balance of the first e-wallet, viz. replacing the balance of the first e-wallet with the refreshed balance of the second e-wallet according to a block number of the storage area for storing the balance of the first e-wallet in the logical cipher card part of the CPU card.

8. The computer-implemented method for loading double e-wallets of claim 1, wherein while waiting to receive an instruction from the terminal, by the CPU card, if an INITIALIZE FOR PURCHASE instruction is sent to the CPU card by the terminal, the method further comprises:
receiving the INITIALIZE FOR PURCHASE instruction, performing an INITIALIZE FOR PURCHASE operation, and returning a response message of INITIALIZE FOR PURCHASE instruction to the terminal, by the CPU card;
receiving the response message of the INITIALIZE FOR PURCHASE instruction, and sending a Purchase instruction to the CPU card, by the terminal;
receiving the Purchase instruction, purchasing with the second e-wallet, refreshing the balance of the first e-wallet and returning a response message of the Purchase instruction to the terminal, by the CPU card; and
receiving the response message of the Purchase instruction by the terminal, and ending the transaction.

9. The computer-implemented method for loading double e-wallets of claim 8, wherein performing an INITIALIZE FOR PURCHASE operation by the CPU card comprises:
reading and storing data in the INITIALIZE FOR PURCHASE instruction, wherein the data comprises a key index number and transaction amount;
determining whether the key index number is supported by the CPU card; if not supported, returning an error message to the terminal, ending the INITIALIZE FOR PURCHASE operation by the CPU card; and
if supported, reading a balance of the second e-wallet, and further determining whether the transaction amount is larger than the balance of the second e-wallet;
if yes, returning an error message to the terminal and ending the INITIALIZE FOR PURCHASE operation;
if no, generating a pseudo random number and a processing key.

10. The computer-implemented method for loading double e-wallets of claim 8, wherein receiving the Purchase instruction and purchasing with the second e-wallet comprises:
reading and storing data in the Purchase instruction, wherein the data comprises a third message identifying code;
determining whether the third message identifying code is valid using the processing key;
if invalid, returning an invalid information of the third message identifying code to the terminal and ending the purchase operation;
if valid, subtracting the transaction amount from the balance of the second e-wallet.

11. The computer-implemented method for loading double e-wallets of claim 10, wherein subtracting the transaction amount from the balance of the second e-wallet comprises:
retrieving address of an application file;
retrieving address of the second e-wallet file in the application file according to the application file;
computing an address where the balance of the second e-wallet is stored according to the retrieved address of the second e-wallet file and a predetermined offset of the balance of the second e-wallet; and
reading data in a storage area, to which the address where the balance of the second e-wallet is stored points, subtracting the transaction amount by the read data, replacing the read data with a difference value from the above subtraction, and taking the difference value as new balance of the second e-wallet.

12. The computer-implemented method for loading double e-wallets of claim 8, wherein refreshing balance of the first e-wallet comprises setting the balance of the first e-wallet to be the balance of the second e-wallet, comprising:
invoking a function to obtain a section key of the first e-wallet according to a section number of a storage area for storing the balance of the first e-wallet in a logical cipher card part of the CPU card; and
invoking a function to set the balance of the first e-wallet, viz. replacing the balance of the first e-wallet with the refreshed balance of the second e-wallet according to a block number of the storage area for storing the balance of the first e-wallet in the logical cipher card part and the section key.

* * * * *